(12) United States Patent
Raghoebardajal

(10) Patent No.: US 11,367,298 B2
(45) Date of Patent: Jun. 21, 2022

(54) TRACKING SYSTEM AND METHOD

(71) Applicant: Sony Interactive Entertainment Inc., Tokyo (JP)

(72) Inventor: Sharwin Winesh Raghoebardajal, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 308 days.

(21) Appl. No.: 16/828,375

(22) Filed: Mar. 24, 2020

(65) Prior Publication Data

US 2020/0311403 A1    Oct. 1, 2020

(30) Foreign Application Priority Data

Mar. 29, 2019 (GB) .................................... 1904454

(51) Int. Cl.
*G06V 40/10* (2022.01)
*G02B 27/00* (2006.01)
(Continued)

(52) U.S. Cl.
CPC ....... *G06V 40/107* (2022.01); *G02B 27/0093* (2013.01); *G02B 27/017* (2013.01); *G06V 40/23* (2022.01); *G02B 2027/0187* (2013.01)

(58) Field of Classification Search
CPC ........... G06K 9/00375; G06K 9/00342; G02B 27/0093; G02B 27/17; G02B 2027/0187
See application file for complete search history.

(56) References Cited

U.S. PATENT DOCUMENTS 9,727,790 B1 * 8/2017 Vaziri ..................... G06F 3/017
2015/0092015 A1    4/2015 Stafford
(Continued)

FOREIGN PATENT DOCUMENTS

| GB | 2515353 A | 12/2014 |
|---|---|---|
| GB | 2565836 A | 2/2019 |
| TW | 201903563 A | 1/2019 |

OTHER PUBLICATIONS

Combined Search and Examination Report for corresponding GB Application No. GB 1904454.4, 2 pages, dated Sep. 11, 2019.
(Continued)

*Primary Examiner* — David Bilodeau
(74) *Attorney, Agent, or Firm* — Matthew B. Dernier, Esq.

(57) ABSTRACT

A system for tracking motion of a user includes one or more peripherals associated with the user, a first camera operable to be mounted upon the user's head, a second camera operable to capture images of the user and the first camera, a first tracking unit operable to determine the position of the one or more peripherals in images captured by the first camera, a second tracking unit operable to determine the position of the first camera and the one or more peripherals in images captured by the second camera, a location generating unit operable to identify the location of the one or more peripherals and the first camera in dependence upon the respective determinations by the first and second tracking units, a tracking validation unit operable to compare the locations of at least one peripheral as determined using the first and second tracking units and determine whether a difference in the locations exceeds a threshold value, and a location output unit operable to output location information for at least the one or more peripherals as identified by the location generating unit, where the location output unit is operable to output location information based upon information from the first tracking unit and information from the second tracking unit in varying contributions in dependence upon the difference in compared locations.

14 Claims, 7 Drawing Sheets

(51) Int. Cl.
*G02B 27/01* (2006.01)
*G06V 40/20* (2022.01)

(56) References Cited

U.S. PATENT DOCUMENTS

| | | | |
|---|---|---|---|
| 2018/0224545 A1* | 8/2018 | Price | G01S 17/86 |
| 2019/0054379 A1* | 2/2019 | Ackley | G06T 19/006 |
| 2019/0243448 A1* | 8/2019 | Miller | A61B 3/113 |
| 2019/0311512 A1* | 10/2019 | VanBlon | G06F 3/017 |
| 2020/0090407 A1* | 3/2020 | Miranda | G02B 27/0093 |
| 2020/0238164 A1* | 7/2020 | Raghoebardajal | H04N 5/2352 |

OTHER PUBLICATIONS

Extended European Search Report for corresponding EP Application No. 20155371.6, 8 pages, dated Aug. 4, 2020.

* cited by examiner

TRACKING SYSTEM AND METHOD

BACKGROUND OF THE INVENTION

Field of the Invention

This disclosure relates to a tracking system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the increase in the number of virtual reality (VR) and other interactive experiences that are available to a user, the availability of high-quality tracking information for a user has become increasingly important. High-quality tracking information is recognised by the accuracy and precision of the tracking information that is generated—the user's location should be able to be determined both correctly with a small degree of uncertainty.

In many cases, the location of a user is determined in dependence upon the equipment that they are using. For example, the user may be wearing a head-mountable display unit (HMD) and using one or more peripherals (such as controllers and active/passive tracking markers). These may be more suitable for identification in images captured in an image-based tracking system, for example due to comprising a distinctive pattern, as well as often including sensors (such as accelerometers or gyroscopes) that indicate the motion of the equipment and therefore user.

One category of methods for performing tracking of a user is described as 'outside-in' tracking. These methods rely on a camera that is able to capture images of the user from a distance (that is, the camera is located on the 'outside' and is looking 'in' on the user). While these methods are useful for capturing a wide view of the tracking environment, they may suffer in accuracy due to occlusions—for example, when the user turns to face away from the camera they may stand between a peripheral they are using and the camera. This therefore means that the camera cannot capture images of the peripheral, and cannot determine its position.

An alternative to this is that of 'inside-out' tracking. These methods rely on a camera that is mounted upon the user and operable to capture images of the environment (that is, the camera is located on the 'inside' and is looking 'out' on the environment). While these methods may be more robust when it comes to the problem of occlusions, peripheral tracking may fail when the peripheral leaves the field of view of the camera. In addition to this, the accuracy and latency associated with these methods may be rather low.

Use of combined tracking methods that incorporate both inside-out and outside-in tracking has been problematic for a number of reasons. For example, each of the tracking systems uses their own representation of the environment in which the user is present. The alignment of these representations is difficult, and can be a source of inaccuracies in the tracking of the user. An improved tracking method is therefore desirable.

SUMMARY OF THE INVENTION

It is in the context of the above problems that the present invention arises.

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
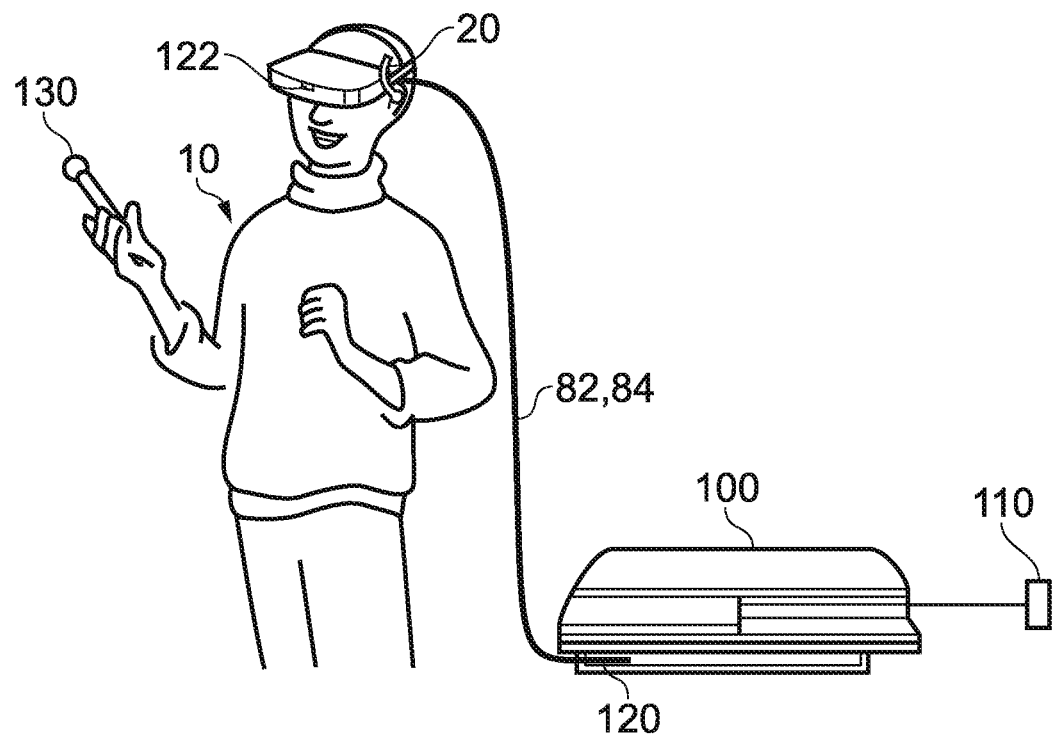
FIG. 1 schematically illustrates a user wearing an HMD.

Referring now to the drawings, wherein like reference numerals designate identical or corresponding parts throughout the several views, FIG. 1 schematically illustrates a user wearing an HMD 20 connected to a Sony® PlayStation 3® games console 100 as an example of a base device. The games console 100 is connected to a mains power supply 110 and (optionally) to a main display screen (not shown). A cable, acting as the cables 82, 84 discussed above (and so acting as both power supply and signal cables), links the HMD 20 to the games console 100 and is, for example, plugged into a USB socket 120 on the console 100. Note that in the present embodiments, a single physical cable is provided which fulfils the functions of the cables 82, 84. In FIG. 1, the user is also shown holding a hand-held controller 130 which may be, for example, a Sony® Move® controller which communicates wirelessly with the games console 100 to control (or to contribute to the control of) game operations relating to a currently executed game program.

The video displays in the HMD 20 are arranged to display images generated by the games console 100, and the earpieces in the HMD 20 are arranged to reproduce audio signals generated by the games console 100. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 100 via the cable 82, 84. These images may be used for motion tracking, presentation to a user, or any combination of these or other purposes; to aid motion tracking a light source (for example, an infra-red light source or visible light source) may be provided. In some embodiments, the camera 122 may be a depth camera or a stereoscopic camera arrangement. Similarly, if motion or other sensors are provided at the HMD 20, signals from those sensors may be at least partially processed at the HMD 20 and/or may be at least partially processed at the games console 100. The use and processing of such signals will be described further below.

The USB connection from the games console 100 also provides power to the HMD 20, according to the USB standard, although power may be received from any number of alternative or additional sources.

As noted above, tracking of the position of the HMD may be performed using images captured by a camera associated with the HMD. This tracking data may be refined or otherwise supplemented by additional motion tracking data, such as that generated by an accelerometer or gyroscope.

Figure 2:
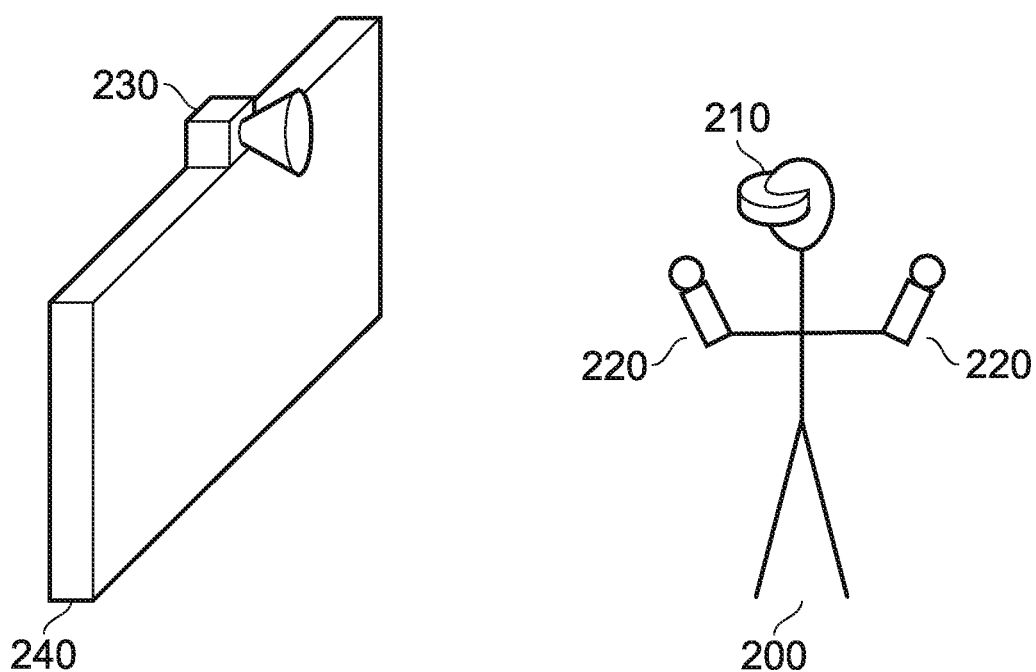
FIG. 2 schematically illustrates an outside-in tracking arrangement.

FIG. 2 schematically illustrates an outside-in tracking arrangement. As described above, outside-in tracking methods rely on a camera that is able to capture images of the user from a distance. FIG. 2 shows a user 200 that is to be tracked, the user 200 wearing an HMD 210 and holding peripherals 220. The environment also includes a camera 230 for capturing images of the user 200 to be used for tracking the motion of the user 200, which is present on top of a display 240 (for example, a television). While the display 240 may be considered non-essential, it may be useful for providing a spectator view to other people in the environment or for providing content to the user 200 in embodiments in which the HMD 210 is not used.

As has been noted, while these methods are useful for capturing a wide view of the tracking environment, they may suffer in accuracy due to occlusions—for example, in FIG. 2 the camera's 230 view of the peripheral 220 that is furthest from the camera 230 may be obstructed by the user's 200 body. This therefore means that the camera 230 cannot capture images of the peripheral 220, and thus cannot determine its position.

By using a camera 230 that is located away from the user 200, it is also possible that the accuracy of the tracking is compromised; this is particularly true for cameras with a low resolution or with poor depth determination.

Figure 3:
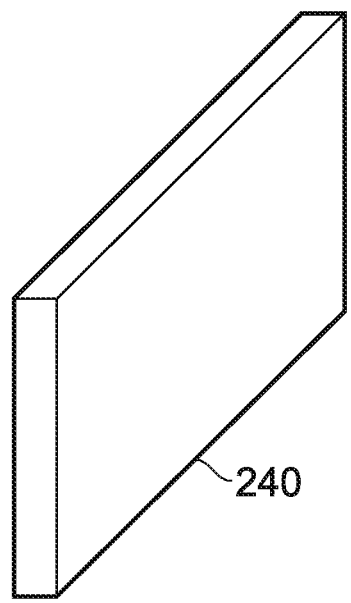
FIG. 3 schematically illustrates an inside-out tracking arrangement.
Figure 3:
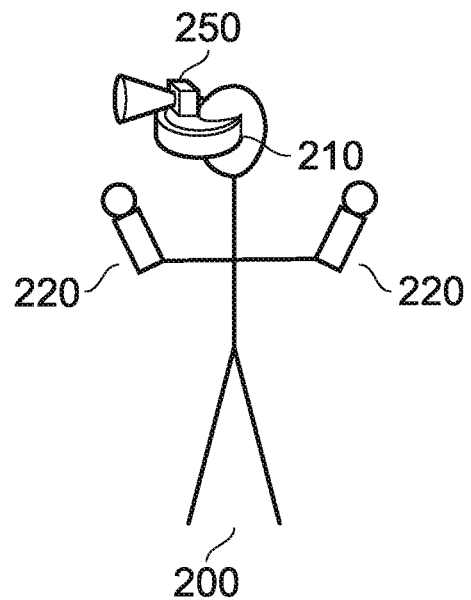

FIG. 3 schematically illustrates an inside-out tracking arrangement. As described above, inside-out tracking methods rely on the use of a camera that is mounted upon the user (such as on an HMD) and operable to capture images of the environment. FIG. 3 shows the user 200 wearing an HMD 210 and holding peripherals 220, with the HMD 210 having a camera 250 mounted upon it. Of course, in embodiments in which the HMD 210 is not present (such as those in which the display 240 is used to display content to a user 200) the camera 250 may be mounted separately upon the user's 200 head (or other body part).

As noted above, the accuracy associated with inside-out tracking methods may be rather low for many applications, while the latency of such a method may be higher than corresponding outside-in tracking methods. In addition to this, the camera 250 may only be able to capture images of one of the peripherals 220 at a time depending upon their positions relative to one another and the camera 250.

Figure 4:
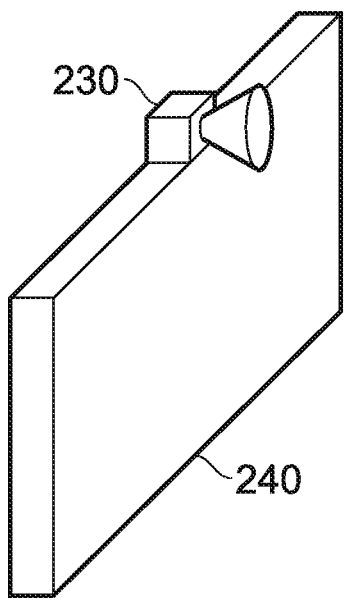
FIG. 4 schematically illustrates a combined tracking arrangement.
Figure 4:
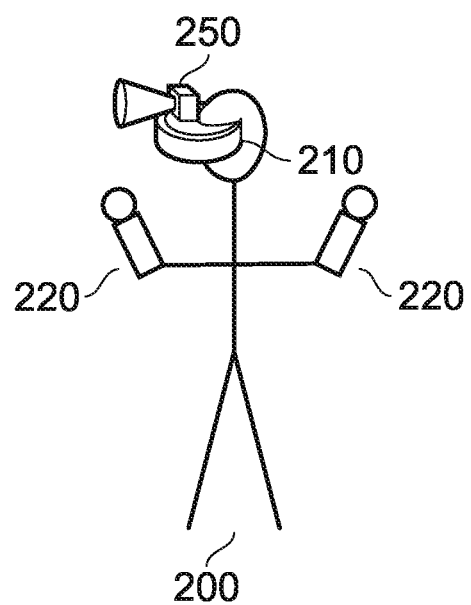

FIG. 4 schematically illustrates a combined tracking arrangement. This arrangement comprises the camera 230 arranged to capture images of the user 200 wearing an HMD 210 and holding peripherals 220, with the HMD 210 having a camera 250 mounted upon it. As discussed above, of course the display 240 may be used to provide content to the user 200 and the HMD 210 may be omitted.

In this arrangement, tracking may be performed using each of the cameras 230 and 250 independently. In general, the tracking methods are most accurate when a peripheral is closer to a camera.

Figure 5:
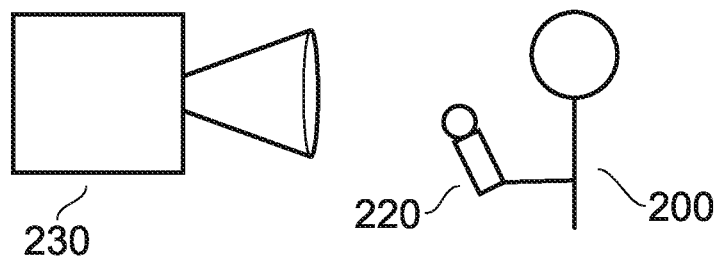
FIGS. 5 and 6 schematically illustrate outside-in tracking positions.
Figure 6:

For example, the tracking of the peripheral 220 will be more accurate in the example shown in FIG. 5 than in the example shown in FIG. 6; the user 200, and by association the peripheral 220, is closer to the camera 230 in FIG. 5.

Figure 7:
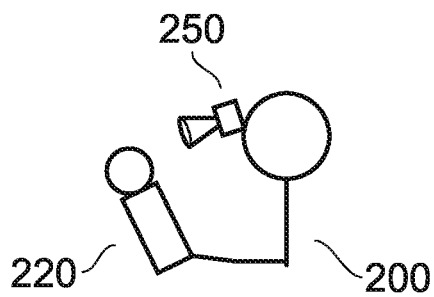
FIGS. 7 and 8 schematically illustrate inside-out tracking positions.
Figure 8:
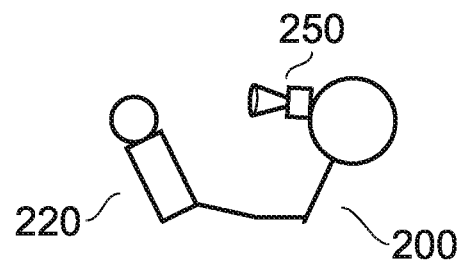

Similarly, the tracking of the peripheral 220 will be more accurate in the example shown in FIG. 7 than in the example shown in FIG. 8; the user 200, and by association the peripheral 220, is closer to the camera 250 in FIG. 7.

In view of this, it is apparent that the relative accuracy of the tracking using each method varies with the location of the peripheral, and that it would be advantageous to be able to use data from each method accordingly.

Figure 9:
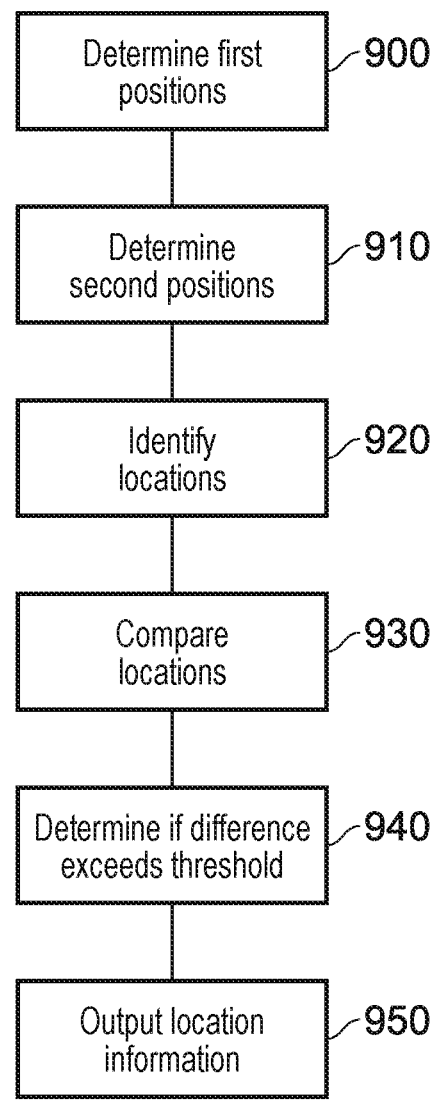
FIG. 9 schematically illustrates a user tracking method.

It is considered in the present disclosure that the two sets of tracking data may be used such that the inside-out tracking acts as a dataset by which the accuracy of tracking data acquired by outside-in tracking may be verified. FIG. 9 shows schematically a method by which this processing may be implemented.

FIG. 9 schematically illustrates a method for tracking motion of a user associated with one or more peripherals, the tracking being performed using a first camera operable to be mounted upon the user's head and a second camera operable to capture images of the user and the first camera. This arrangement is described in more detail below, with reference to FIGS. 12 and 13.

A step 900 comprises determining one or more respective first positions corresponding to the position of the one or more peripherals in images captured by the first camera using any suitable method. For example, this may comprise identifying the position of a peripheral in an image captured by the first camera based upon object or pattern recognition techniques. In order to simplify such an identification process, the peripheral may have a distinctive profile, light up in a distinctive colour, or comprise a pattern such as an AR marker.

A step 910 comprises determining a plurality of respective second positions corresponding to the position of the first camera and the one or more peripherals in images captured by the second camera. This is similar to the detection of step 900, although it additionally includes determining a position of the first camera. In either of these method steps, the process may use previous position information and/or other information (such as information from inertial sensors associated with a peripheral) in order to identify a likely location of the peripherals or cameras in the captured images.

A step 920 comprises identifying the location of the one or more peripherals and the first camera in dependence upon the respective first and second positions. This step results in the generation of a real-world location (in any suitable coordinate system, such as using the first or second cameras as the origin of a coordinate system used to describe locations) based upon image positions determined in steps 900 and/or 910. This may involve any suitable conversion between coordinate systems and/or conversions between image positions and real-world locations. An example of the use of a transform method is disclosed below with reference to FIG. 10.

A step 930 comprises comparing the locations of at least one peripheral as identified from the respective first and second positions. For example, this may include identifying a difference in the positions in each of one or more dimensions (such as the height difference) in any suitable coordinate system. Alternatively, or in addition, a magnitude of the distance between the identified locations may be calculated.

A step 940 comprises determining whether a difference in the locations exceeds a threshold value. This threshold value may be determined in any suitable manner, or may be freely selected by the skilled person. For example, the threshold value may be determined in dependence upon a desired tracking accuracy, or the accuracy of the respective first and second position determining steps. For example, in an embodiment in which precision is not particularly important (for example, only general motion detection is required rather than the detection of a specific location) the threshold may be defined as 10 centimetres or even higher. Conversely, in an embodiment in which precision is considered more important (such as using a peripheral as a cursor for interacting with an application) the threshold may be smaller, such as 5 centimetres or below.

This threshold may also be determined in respect of the latency requirements for an application. For instance, the threshold may be increased (for example, 15 centimetres or more) for an application in which the latency of an input is more important than the accuracy (such as in a game in which a user has to raise their peripheral quickly to perform an action, such as to 'buzz in' in a quiz game); this is in view of the fact that outside-in tracking is often more responsive than inside-out tracking, and the reduction in accuracy is not a particularly important concern in some applications.

This threshold may also be defined so as to apply only to location differences in a particular direction—for example, in an application in which height is the most important coordinate the threshold may be applied to the height difference only. Similarly, different thresholds may be determined for any of the location coordinates used and the number of exceeded thresholds required for a change in operation may be freely selected. For example, exceeding any defined threshold may cause the tracking method to be modified, or it may be required that two or more (or all) thresholds must be exceeded.

For instance, an application in which only a vague position need be determined (such as 'up', 'down', 'left' or 'right') for a peripheral held by a user may have a higher threshold assigned to it—this reflects the fact that the lower degree of accuracy is required than in an application in which a more precise location of the peripheral is required (such as for interacting with a displayed menu).

Of course, the skilled person would appreciate that in a discussion relating to the exceeding of a threshold the threshold value itself may be considered to be a part of the 'above threshold' or 'below threshold' domains. For instance, in some embodiments it may be considered that 'exceeding' may be taken to mean 'equaling or exceeding' such that a measurement equaling the threshold is considered to trigger the processing associated with exceeding the threshold. Alternatively, where appropriate, it may be considered that 'exceeding' means that the measured value has a distinctly larger value than that defined as the threshold.

Step 940 is described in more detail below with reference to FIG. 11, as part of a tracking validation process.

A step 950 comprises outputting location information for at least the one or more peripherals. The output location information depends on the results of the comparison performed in step 930 and the determination of step 940, such that the output location information is based upon first position information and second position information from the second tracking unit in varying contributions in dependence upon the difference in compared locations.

For example, location information based upon the second position is used in the case that the difference in compared locations does not exceed a threshold value, and location information based upon the first position is used in the case that the difference in compared locations exceeds that threshold value. This is an example in which the contributions are used in a binary fashion, such that the contribution is 100% or 0% for the two units in dependence upon whether the difference in location exceeds the threshold.

Of course, the contributions of each set of position information may be varied in a more gradual manner. For example, when the location difference is at 50% of a threshold amount, the contributions of the respective sets of position information may also be at 50%—that is, the respective sets of position information may be combined such that each has an equal weighting. The numbers provided here are of course exemplary, and any suitable thresholds and contributions may be utilised as appropriate.

In some cases, a threshold may not be defined at all and instead it may be the case that contributions are defined for a predefined difference in locations (such as no difference, or a difference of 5 cm/10 cm/50 cm or any other distance in dependence upon a desired accuracy for an application using the tracking information) and the contributions vary as appropriate as the location difference varies with respect to this value. For example, at zero location difference the second position information may be used with a 100% contribution while the first position information is used with a 0% contribution. The contribution of the second position information may decrease as the location difference increases, while the contribution of the first position information may increase as the location difference increases.

With regards to the varying of the contributions with respect to varying differences in the determined location using each set of position information, any suitable varying scheme may be implemented. A first example is that of a linear variation in which the respective contributions are defined to increase/decrease a predefined amount for each increment for which the location difference increases. For example for every five centimetres for which the location difference increases, the contribution of the second position information may decrease by 10% (in the case that the second position information is dominant at low differences) while the contribution of the first position information may increase by 10%—this represents a gradient of two percent per centimetre. Of course, any suitable gradient of linear variation may be used, as appropriate for a particular tracking scenario.

Similarly, non-linear variations may also be considered. For instance, an exponentially/logarithmically varying contribution profile may be used such that at low (or high, depending on how this profile is implemented) location difference values the change in contribution is extremely low, while at higher location difference values the contributions vary more quickly.

Alternatively, or in addition, any other suitable functions may be used to describe a profile for contribution variations with varying location difference. For example, a sigmoidal function may be defined that has a very steep gradient along a portion of the profile, and a smaller gradient at either end. Similarly, portions of polynomial curves or trigonometric functions may be used as gradient profiles. The use of a sharp threshold (as described above) may be considered a special case of this, in which a step function is defined such that the step occurs at a threshold value.

Any number of other suitable steps may be performed as a part of the tracking method; for example, a SLAM (Simultaneous Localisation and Mapping) process may be implemented using images captured by the first camera so as to generate a map of the environment in which the first camera is present. Such a map may be useful in both locating the first camera and converting between an image position and a real environment position for the one or more peripherals.

Figure 10:
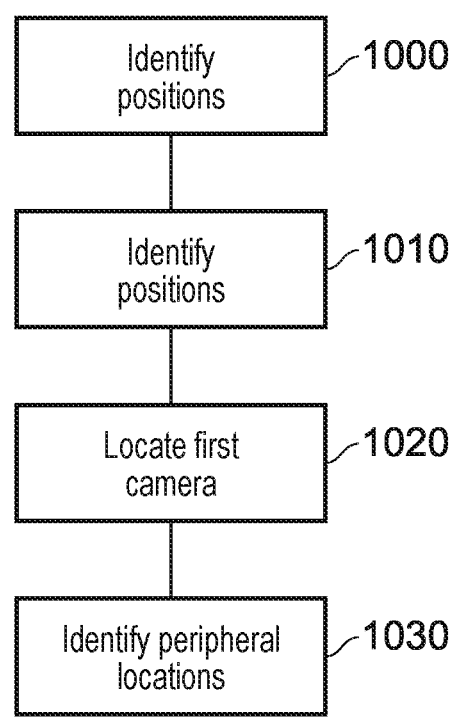
FIG. 10 schematically illustrates a verification method.

FIG. 10 schematically illustrates a transform method. Such a method may be used to transform an identified image position of a feature (such as a peripheral associated with a user) to a location in the real world environment in any suitable coordinate system for use to provide inputs to an application. The order of the steps as described below is not intended to be limiting; the steps may be performed in any suitable order, and one or more steps may be omitted as appropriate.

In a step 1000, respective positions of one or more peripherals are identified in images captured by the first camera.

In a step 1010, respective positions of the one or more peripherals and the first camera are identified in images captured by the first camera.

In a step 1020, a location of the first camera is identified in dependence upon an identified position of the first camera in images captured by the second camera. In some embodiments, this step may be omitted or replaced by determinations of the position of the first camera using alternative methods—for instance, a SLAM-based tracking method, or the use of inertial motion sensors for tracking the position of the first camera.

In a step 1030, real-world locations of the one or more peripherals are identified in dependence upon the respective positions of one or more peripherals as identified in images captured by the first camera, and the location of the first camera as identified in dependence upon an identified position of the first camera in images captured by the second camera.

This step may include the use of a transform to convert between positions identified using the first camera and locations in the real environment—for example, a conversion between the location of a peripheral relative to the first camera (or a position in images captured by the first camera) and a location in the real environment. Such a transform may account for any distortion in the image, such as from the use of a wide-angle lens for capturing images to be used for tracking, rather than requiring a separate transform to be applied.

Figure 11:
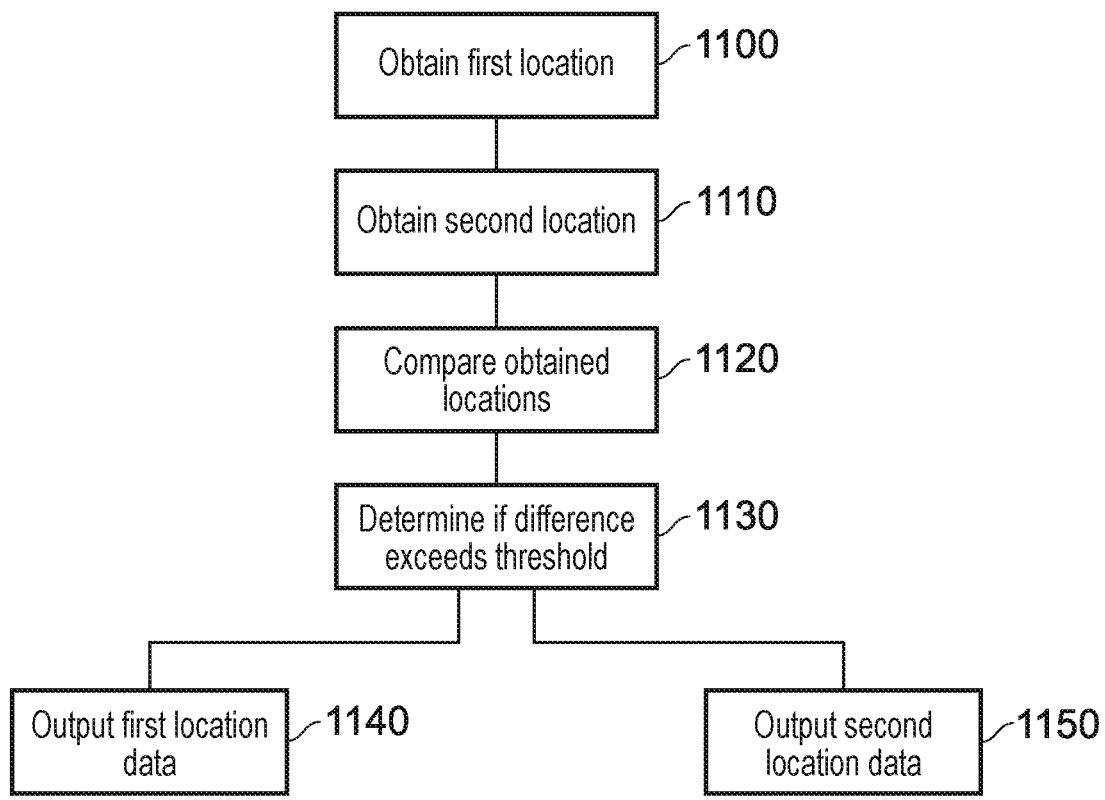
FIG. 11 schematically illustrates a transform method.

FIG. 11 schematically illustrates a verification method. In summary, such a method determines whether tracking information relating to the one or more peripherals should be obtained from images captured by the first camera or the second camera. This is therefore a determination of whether inside-out (first camera) or outside-in (second camera) tracking should be used as the dominant tracking method.

Such a method may be implemented for the system as a whole, or on a per-peripheral basis, or in any other suitable manner. For example, if a user is holding two peripherals and one is occluded from the view of the outside-in tracking system then inside-out tracking is used for either the occluded peripheral or both peripherals. The use of inside-out tracking for one/both peripherals in such a scenario may be determined freely by the skilled person, and may be determined based upon other conditions (such as a difference between locations for the non-occluded peripheral as determined by each method exceeding a threshold—the threshold may be lower than when both peripherals are in view of the outside-in tracking system).

A step 1100 comprises obtaining a first location for one or more peripherals as identified using images captured by the first camera. That is, a location of the one or more peripherals is determined using the inside-out tracking method.

A step 1110 comprises obtaining a second location for the one or more peripherals as identified using images captured by the second camera. That is, a location of the one or more peripherals is determined using the outside-in tracking method.

A step 1120 comprises comparing the respective obtained locations to determine a difference between them. In some embodiments, this may comprise the calculation of the magnitude of the difference between the locations, while in others a comparison may be made on a component-by-component basis (for example, for each of the x/y/z coordinates).

Of course, such an analysis should not be limited to a Cartesian coordinate system—it may be appropriate to use a spherical polar coordinate system, or any other alternative, for specific applications. It may be useful to express this difference as a vector (describing the direction and distance between one location and another, for example describing the relative location of the second location with respect to the first) in some embodiments, for example so as to enable analysis of the location difference to be performed as appropriate.

A step 1130 comprises a determination of whether the difference between the locations (as calculated in step 1120) exceeds a threshold value. As discussed above, this threshold may relate to the magnitude of the difference between the locations, or the magnitude of any one or more components of the location difference. The magnitude of the difference between the locations may be calculated by determining the magnitude of a vector that describes this difference, for example.

The step 1130 may comprise multiple determinations, or the step 1130 may be performed multiple times. For example, the step 1130 may be performed for each of the coordinate components describing the difference in locations, and/or for each of the peripherals that are being tracked.

If a determination is made in step 1130 that the difference between the obtained locations for a peripheral does exceed the threshold, then the process proceeds to step 1140 in which the first location data (that is, the result of the inside-out tracking method) is output for use by an application. Similarly, processing proceeds to step 1140 in the case that no second location information is obtained; in effect, this means that if the second camera is unable to see the peripheral (or the location determining method cannot be implemented, for example if not enough markers can be identified in captured images to enable the position of the peripheral in the image to be accurately determined) then the tracking is switched to the inside-out method.

If a determination is made in step 1130 that the difference between the obtained locations for a peripheral does not exceed the threshold, then the process proceeds to step 1150 in which the second location data (that is, the result of the outside-in tracking method) is output for use by an application. Similarly, processing proceeds to step 1150 in the case that no first location information is obtained; in effect, this means that if the first camera is unable to see the peripheral (or the location determining method cannot be implemented) then the tracking continues using the outside-in method (or is switched back to the outside-in method, if it is not already in use).

When switching between the two tracking methods, it is possible that the jump between the corresponding sets of location data is rather significant; while the difference between the obtained locations (as compared in step 1130) may be small in some cases, it is possible that they differ by significantly more than a threshold amount when errors or large inaccuracies occur. In such cases, it may be useful to provide an intermediate transform for converting between the two tracking spaces (that is, the coordinate systems of the respective tracking methods). Such a transform may be advantageous in some embodiments as the tracking space of the head-mounted camera may be dependent upon a measurement of the position of the camera as determined in the tracking space of the external camera.

As noted above, the determination of step 1130 may be performed on a per-peripheral basis, or for the system as a whole. For example, the method may proceed to step 1140 so as to output first location data for each of two or more peripherals even in the case that only one peripheral is determined to have a difference between obtained locations that does exceed the threshold. Alternatively, in the same exemplary scenario, the method may output first location data for one or more peripherals and second location data for one or more other peripherals as appropriate.

Figure 12:
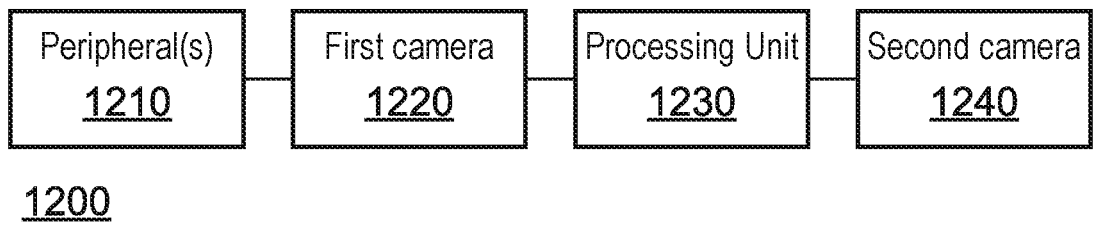
FIG. 12 schematically illustrates a user tracking system.

FIG. 12 schematically illustrates a system for tracking the motion of a user and one or more peripherals associated with the user. This system 1200 comprises one or more peripherals 1210, a first camera 1220, a processing unit 1230, and a second camera 1240.

The one or more peripherals 1210 are associated with the user, for example being held by the user or being affixed to the user. Examples of peripherals 1210 include handheld game controllers and microphones, as well as tracking markers such as AR markers or IR beacons that are affixed to the user (such as via a strap or pinned to clothing) in order to assist with tracking. In some embodiments these peripherals are operable to transmit information to the processing unit 1230, such as information about inputs from a user or tracking information obtained from inertial motion sensors.

The first camera 1220 is operable to be mounted upon the user's head. In some embodiments the first camera 1220 is associated with a head-mountable display unit, although it is considered that the first camera 1220 may be independently mounted upon the user's head.

The first camera 1220 should be configured so as to be able to capture images of one or more peripherals 1210 associated with the user; of course, this may not always be possible given that the peripherals 1210 may change position with the user's motion and fall outside of the field of view. It is therefore considered that the first camera 1220 should capture a sufficiently large image so as to cause the image capture of the one or more peripherals 1210 to be likely.

The processing unit 1230 is operable to perform tracking processing and to determine the correct location to use for each of the one or more peripherals 1210 (that is, whether to use tracking information derived from the first camera 1220 or the second camera 1240). The processing unit 1230 may further be operable to execute one or more applications, such as a computer game or other program that may use the location of the one or more peripherals 1210 as an input. The processing unit 1230 is described below in more detail with reference to FIG. 13.

The second camera 1240 is operable to capture images of the user (and therefore the one or more peripherals 1210 associated with the user) and the first camera 1220. The second camera 1240 may be located at any position in the environment in which the user is present, although in many cases it is expected to be associated with the processing unit 1230.

It may be the case that the second camera 1240 is unable to capture images of one or more peripherals 1210 due to occlusions or the like, however the second camera 1240 should be arranged so as to capture images of a suitably large portion of the environment in which the user is present so as to increase the likelihood of being able to capture images of the one or more peripherals 1210.

Of course, references to 'first camera 1220' and 'second camera 1240' may refer to any suitable image capture arrangement. For example, one or both of the arrangements may comprise multiple cameras and any suitable camera type. For instance, cameras that are sensitive to IR wavelengths may be used rather than (or as well as) cameras for capturing images using the visible portion of the spectrum. It is also considered that depth cameras may be used, or stereoscopic camera pairs. In some embodiments one or more cameras may be provided with wide-angle lenses so as to increase the field of view; any lens that gives an angle of view of between 64° and 84°, or indeed a greater angle of view (such as a fish-eye lens which offers an angle of view of 180°), could be used.

Figure 13:
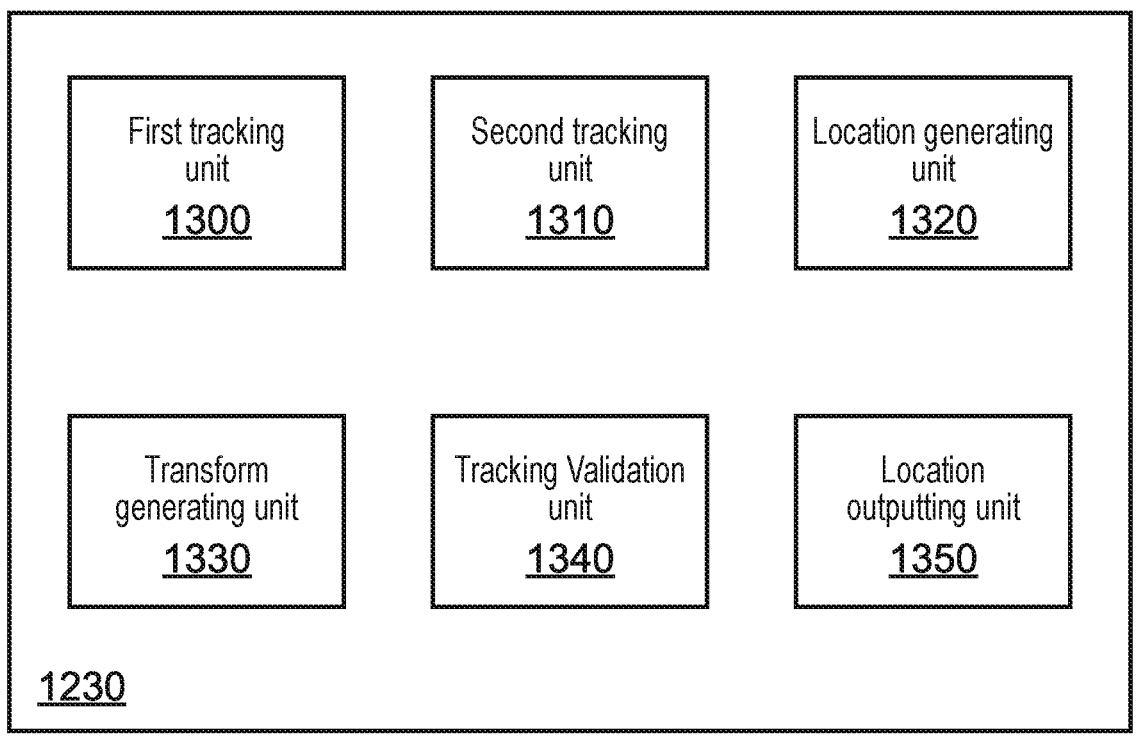
FIG. 13 schematically illustrates a processing unit forming a part of the user tracking system.

FIG. 13 schematically illustrates the processing unit 1230, as discussed with reference to the tracking system 1200 of FIG. 12. The processing unit 1230 comprises a first tracking unit 1300, a second tracking unit 1310, a location generating unit 1320, a transform generating unit 1330, a tracking validation unit 1340, and a location outputting unit 1350. The processing unit 1230 may be comprised as a part of a games console or a computer or the like.

The first tracking unit 1300 is operable to determine the position of the one or more peripherals 1210 in images captured by the first camera 1220. This may include determining a position of one or more peripherals 1210 in an image captured by the first camera 1220, and may further include the use of position or motion information generated by the peripherals 1210. Exemplary uses of such information include refining the position estimate or predicting the position so as to anticipate which region of the captured image the peripheral (or peripherals) 1210 would be expected to appear in.

In some embodiments, the first tracking unit 1300 is operable to perform a simultaneous localisation and mapping (SLAM) process using images captured by the first camera 1220. Such a method enables a map of the environment to be generated during use of the first camera 1220, and enables the location of the first camera 1220 within that environment to be determined. This may be used instead of, or in conjunction with, the tracking of the first camera 1220 that is performed by the second tracking unit 1310 using images captured by the second camera 1240.

The second tracking unit 1310 is operable to determine the position of the first camera 1220 and the one or more peripherals 1210 in images captured by the second camera 1240. This may include determining a position of one or more peripherals 1210 in an image captured by the second camera 1240, and may further include the use of position or motion information generated by the peripherals 1210 and/or first camera 1220 (or a headset associated with the first camera 1220). Exemplary uses of such information include refining the position estimate or predicting the position so as to anticipate which region of the captured image the peripheral (or peripherals) 1210 and/or first camera 1220 would be expected to appear in.

The location generating unit 1320 is operable to identify the location of the one or more peripherals 1210 and the first camera 1220 in dependence upon the respective determinations by the first and second tracking units 1300, 1310. The location generating unit 1320 is therefore operable to convert an image position for one or more peripherals 1210 (as determined by the first and second tracking units 1300, 1310) into a location in the tracking environment. This may be performed in a number of ways, for example by applying a transform between in-image coordinates and in-environment coordinates or by performing image processing methods to detect a depth (alternatively, using data from a depth camera) and horizontal/vertical placement of the one or more peripherals 1210 in the environment.

As discussed above, the first tracking unit 1300 may implement a SLAM process to generate a map of the environment in which the tracking is to be performed (that is, the environment in which the user is present). In such embodiments, the location generating unit 1320 may be operable to determine a location of one or more peripherals 1210 using the generated map and the position information determined by the first tracking unit 1300. Similarly, the location generating unit 1320 may be operable to determine a location of the first camera 1220 using the generated map and the position information determined by the first tracking unit 1300.

The transform generating unit 1330 is operable to generate a transform to convert between position information determined by the first tracking unit 1300 and a location in the environment. Such a transform may be used by the location generating unit 1320 as described above. Such a transformation may comprise both a conversion between different coordinate systems and a transformation between a distorted image position and a corrected image position—an example of this is converting from an image captured with a wide-angle lens into a flat image that may be more useful for identifying the location of the one or more peripherals 1210 that are imaged.

The tracking validation unit 1340 is operable to compare the locations of at least one peripheral 1210 as determined using the first and second tracking units 1300, 1310 and determine whether a difference in the locations exceeds a threshold value. The threshold value may be different for one or more respective location coordinates and/or peripherals In some embodiments, the tracking validation unit 1340 is operable to compare the locations of at least one peripheral 1210 as determined using the first and second tracking units 1300, 1310 and determine whether a difference in the locations exceeds a threshold value separately for each of one or more coordinates of the location.

Alternatively, or in addition, the tracking validation unit 1340 may be operable to compare the locations of two or more peripherals 1210 as determined using the first and second tracking units 1300, 1310 and determine whether a difference in the locations exceeds a threshold value separately for each of the two or more peripherals 1210.

The location output unit 1350 is operable to output location information for at least the one or more peripherals 1210 as identified by the location generating unit 1320, with the location information that is output being determined in dependence upon the determination of the tracking validation unit 1340. That is to say, the location output unit 1350 is operable to output location information based upon information from the first tracking unit and information from the second tracking unit in varying contributions in dependence upon the difference in compared locations. The location information that is output by the location output unit 1350 may be used as an input for a game, for example, or to control any other suitable processing operation.

The location output unit 1350 is operable to output location information based upon information from the second tracking unit 1310 in the case that the difference in compared locations does not exceed a threshold value, and the location output unit 1350 is operable to output location information based upon information from the first tracking unit 1310 in the case that the difference in compared locations exceeds the threshold value. In other words, when the difference between identified locations increases above a threshold value the tracking method switches from outside-in to inside-out.

It is also considered that the location output unit 1350 may be operable to output location information based upon information from the first tracking unit 1300 for those peripherals 1210 for which the difference in at least one coordinate of the compared locations exceeds the threshold value, and to output location information based upon information from the second tracking unit 1310 for those peripherals 1210 for which the difference in the compared locations does not exceeds threshold value for any coordinates of the compared location.

Alternatively, or in addition, the location output unit 1350 may be operable to output location information based upon information from the first tracking unit 1300 for all of the peripherals 1210 in the case that the difference in compared locations exceeds the threshold value for any coordinate of any of the one or more peripherals 1210.

The processing unit 1220 is an example of a processor that, when used in conjunction with a first camera operable to be mounted upon the user's head, a second camera operable to capture images of the user and the first camera, and one or more peripherals associated with the user, is operable to:

determine the position of the one or more peripherals in images captured by the first camera;

determine the position of the first camera and the one or more peripherals in images captured by the second camera;

identify the location of the one or more peripherals and the first camera in dependence upon the respective determinations by the first and second tracking units;

compare the locations of at least one peripheral as determined using the first and second tracking units and determine whether a difference in the locations exceeds a threshold value; and output unit operable to output location information for at least the one or more peripherals as identified by the location generating unit, wherein the location output unit is operable to output location information based upon information from the first tracking unit and information from the second tracking unit in varying contributions in dependence upon the difference in compared locations.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for tracking motion of a user, the system comprising:
   one or more peripherals associated with the user;
   a first camera operable to be mounted upon the user's head;
   a second camera operable to capture images of the user and the first camera;
   a first tracking unit operable to determine the position of the one or more peripherals in images captured by the first camera;
   a second tracking unit operable to determine the position of the first camera and the one or more peripherals in images captured by the second camera;
   a location generating unit operable to identify the location of the one or more peripherals and the first camera in dependence upon the respective determinations by the first and second tracking units;
   a tracking validation unit operable to compare the locations of at least one peripheral as determined using the first and second tracking units and determine whether a difference in the locations exceeds a threshold value; and
   a location output unit operable to output location information for at least the one or more peripherals as identified by the location generating unit,
   wherein the location output unit is operable to output location information based upon information from the first tracking unit and information from the second tracking unit in varying contributions in dependence upon the difference in compared locations.

2. The system of claim 1, wherein the location output unit is operable to output location information based upon information from the second tracking unit in the case that the difference in compared locations does not exceed a threshold value, and
   wherein the location output unit is operable to output location information based upon information from the first tracking unit in the case that the difference in compared locations exceeds the threshold value.

3. The system of claim 1, wherein the first camera is associated with a head-mountable display unit.

4. The system of claim 1, wherein the tracking validation unit is operable to determine that a location difference exceeds a threshold value when position information is not generated by the second tracking unit.

5. The system of claim 1, comprising a transform generating unit operable to generate a transform to convert between position information determined by the first tracking unit and a location in the environment.

6. The system of claim 1, wherein the first tracking unit is operable to perform a simultaneous localisation and mapping process using images captured by the first camera.

7. The system of claim 6, wherein the location generating unit is operable to determine a location of one or more peripherals using the generated map and the position information determined by the first tracking unit.

8. The system of claim 6, wherein the location generating unit is operable to determine a location of the first camera using the generated map and the position information determined by the first tracking unit.

9. The system of claim 1, wherein the tracking validation unit is operable to compare the locations of at least one peripheral as determined using the first and second tracking units and determine whether a difference in the locations exceeds a threshold value separately for each of one or more coordinates of the location.

10. The system of claim 1, wherein the tracking validation unit is operable to compare the locations of two or more peripherals as determined using the first and second tracking units and determine whether a difference in the locations exceeds a threshold value separately for each of the two or more peripherals.

11. The system of claim 10, wherein the location output unit is operable to output location information based upon information from the first tracking unit for those peripherals for which the difference in at least one coordinate of the compared locations exceeds the threshold value, and to output location information based upon information from the second tracking unit for those peripherals for which the difference in the compared locations does not exceeds threshold value for any coordinates of the compared location.

12. The system of claim 10, wherein the location output unit is operable to output location information based upon information from the first tracking unit for all of the peripherals in the case that the difference in compared locations exceeds the threshold value for any coordinate of any of the one or more peripherals.

13. A method for tracking motion of a user associated with one or more peripherals, the tracking being performed using a first camera operable to be mounted upon the user's head and a second camera operable to capture images of the user and the first camera, the method comprising:
   determining one or more respective first positions corresponding to the position of the one or more peripherals in images captured by the first camera;
   determining a plurality of respective second positions corresponding to the position of the first camera and the one or more peripherals in images captured by the second camera;
   identifying the location of the one or more peripherals and the first camera in dependence upon the respective first and second positions;
   comparing the locations of at least one peripheral as identified from the respective first and second positions;
   determining whether a difference in the locations exceeds a threshold value; and
   outputting location information for at least the one or more peripherals,
   wherein the location information is based upon information from the first tracking unit and information from the second tracking unit in varying contributions in dependence upon the difference in compared locations.

14. A non-transitory machine-readable storage medium which stores computer software which, when executed by a computer, causes the computer to perform a method for tracking motion of a user associated with one or more peripherals, the tracking being performed using a first camera operable to be mounted upon the user's head and a second camera operable to capture images of the user and the first camera, the method comprising:

determining one or more respective first positions corresponding to the position of the one or more peripherals in images captured by the first camera;

determining a plurality of respective second positions corresponding to the position of the first camera and the one or more peripherals in images captured by the second camera;

identifying the location of the one or more peripherals and the first camera in dependence upon the respective first and second positions;

comparing the locations of at least one peripheral as identified from the respective first and second positions;

determining whether a difference in the locations exceeds a threshold value; and outputting location information for at least the one or more peripherals, wherein the location information is based upon information from the first tracking unit and information from the second tracking unit in varying contributions in dependence upon the difference in compared locations.

* * * * *